(12) United States Patent
Liu et al.

(10) Patent No.: US 12,256,236 B2
(45) Date of Patent: Mar. 18, 2025

(54) DETERMINING DEFAULT SPATIAL RELATION FOR UL SIGNALS

(71) Applicant: Lenovo (Beijing) Limited, Beijing (CN)

(72) Inventors: Bingchao Liu, Changping District (CN); Chenxi Zhu, Haidian District (CN); Wei Ling, Changping (CN); Lingling Xiao, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 385 days.

(21) Appl. No.: 17/642,509

(22) PCT Filed: Oct. 11, 2019

(86) PCT No.: PCT/CN2019/110596
§ 371 (c)(1),
(2) Date: Mar. 11, 2022

(87) PCT Pub. No.: WO2021/068192
PCT Pub. Date: Apr. 15, 2021

(65) Prior Publication Data
US 2022/0345903 A1    Oct. 27, 2022

(51) Int. Cl.
*H04W 16/28* (2009.01)
*H04L 5/00* (2006.01)
*H04W 72/1263* (2023.01)
*H04W 72/23* (2023.01)

(52) U.S. Cl.
CPC .......... *H04W 16/28* (2013.01); *H04L 5/0051* (2013.01); *H04W 72/1263* (2013.01); *H04W 72/23* (2023.01)

(58) Field of Classification Search
CPC . H04W 16/28; H04W 72/1263; H04W 72/23; H04L 5/0051; H04L 5/0053
See application file for complete search history.

(56) References Cited

U.S. PATENT DOCUMENTS

| | | | |
|---|---|---|---|
| 12,069,587 B2* | 8/2024 | Guo | H04W 52/242 |
| 2018/0227094 A1* | 8/2018 | Liu | H04B 7/06966 |
| 2019/0229792 A1* | 7/2019 | John Wilson | H04L 5/0051 |
| 2019/0268961 A1* | 8/2019 | Tsai | H04W 16/28 |
| 2020/0413409 A1* | 12/2020 | Zhou | H04W 72/21 |

(Continued)

FOREIGN PATENT DOCUMENTS

| | | | | |
|---|---|---|---|---|
| CN | 110089181 A | | 8/2019 | |
| CN | 111106863 B | * | 8/2023 | ............... H04B 7/06 |
| WO | 2019161786 A1 | | 8/2019 | |

OTHER PUBLICATIONS

"International Preliminary Report on Patentability", PCT Application No. PCT/CN2019/110596, Apr. 21, 2022, 5 pages.

(Continued)

*Primary Examiner* — Deepa Belur
(74) *Attorney, Agent, or Firm* — FIG. 1 Patents (57) ABSTRACT

Methods and apparatuses for determining default spatial relation for uplink signals are disclosed. A method comprising: determining a default spatial relation for transmission of an uplink signal if no higher layer parameter for indicating a spatial relation is configured for the transmission of the uplink signal; and transmitting the uplink signal using the determined default spatial relation.

20 Claims, 7 Drawing Sheets

(56) References Cited

U.S. PATENT DOCUMENTS

| | | | |
|---|---|---|---|
| 2021/0105805 A1* | 4/2021 | Venugopal | H04L 25/0226 |
| 2021/0314784 A1* | 10/2021 | Gao | H04B 7/0691 |
| 2021/0410124 A1* | 12/2021 | Chen | H04L 1/1854 |
| 2022/0224479 A1* | 7/2022 | He | H04L 5/0044 |
| 2022/0225120 A1* | 7/2022 | Matsumura | H04L 5/0023 |
| 2022/0393827 A1* | 12/2022 | Chen | H04W 52/08 |
| 2022/0408371 A1* | 12/2022 | Matsumura | H04W 52/367 |
| 2023/0198719 A1* | 6/2023 | Wang | H04B 7/024 |
| | | | 370/329 |
| 2024/0057115 A1* | 2/2024 | Lo | H04L 5/0094 |

OTHER PUBLICATIONS

"International Search Report and Written Opinion", PCT Application No. PCT/CN2019/110596, Jul. 10, 2020, 6 pages.

Ericsson, "Remaining details of beam management", 3GPP TSG RAN WG1 Meeting #92bis, R1-1804974, Sanya, China, Apr. 2018, 13 pages.

Fujitsu, "Ambiguities about PUCCH beam indication", 3GPP TSG RAN WG1 Meeting #93, R1-1806120, Busan, Korea, May 2018, 4 pages.

Huawei, et al., "Remaining issue for beam management", 3GPP TSG RAN WG1 Meeting #92bis, R1-1803636, Sanya, China, Apr. 2018, 7 pages.

\* cited by examiner

DETERMINING DEFAULT SPATIAL RELATION FOR UL SIGNALS

FIELD

The subject matter disclosed herein generally relates to wireless communications, and more particularly relates to methods and apparatuses for determining default spatial relation for uplink signals, e.g., uplink sounding reference signal such as SRS and uplink control signal such as PUCCH.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Downlink control information (DCI), single DCI (S-DCI), transmission reception point (TRP), multiple TRP (multi-TRP or M-TRP), frequency range 2 (FR2), Quasi Co-Location (QCL), channel state information reference signal (CSI-RS), CSI-RS Resource Indicator (CRI), Code Division Multiplexing (CDM), Transmission Configuration Indication (TCI), Sounding Reference Signal (SRS), Control Resource Set (CORESET), Physical Broadcast Channel (PBCH), Synchronization Signal (SS), reference signal (RS).

For SRS and PUCCH transmission in FR2 (24.25 GHz-52.6 GHz), a higher layer parameter spatialRelationInfo can be used to indicate the spatial relation, e.g. the spatial domain filter, for the transmission of SRS resource(s) or PUCCH resource(s). However, this parameter is an optional configuration even in FR2. If the higher layer parameter spatialRelationInfo is not configured for the UE in FR2, the UE should determine a default spatial relation for the SRS and PUCCH transmission.

This disclosure targets the determination of the default spatial relation for the SRS and PUCCH resources in FR2 in RRC connected mode if the spatialRelationInfo is not configured in both single TRP and multi-TRP scenarios.

BRIEF SUMMARY

Methods and apparatuses for determining default spatial relation for uplink signals are disclosed.

In one embodiment, a method comprises determining a default spatial relation for transmission of an uplink signal if no higher layer parameter for indicating a spatial relation is configured for the transmission of the uplink signal; and transmitting the uplink signal using the determined default spatial relation. The default spatial relation may be one of the spatial relations for reception of CORESET used for transmitting triggering DCI, for reception of CORESET configured with the same index value as the CORESET for transmitting triggering DCI, for reception of the latest received PDSCH, for transmission of the latest PUSCH, for reception of a reference signal indicated by the higher layer parameter pathlossReferenceRS or PUCCH-PathlossReferenceRS, and for transmission of the latest SRS. The uplink signal may be an uplink sounding reference signal SRS or a signal transmitted in an uplink control channel PUCCH.

In one embodiment, the method further comprises reporting a UE capability to indicate a time duration threshold for determining the spatial relation for the uplink signal. If the UE capability is not reported, the time duration threshold is assumed to be 0 ms.

In another embodiment, aperiodic SRS resource(s) triggered by a DCI are transmitted, an index is configured for each CORESET, and the default spatial relation is determined as a spatial relation for a reception of a CORESET configured with the same index value as the CORESET transmitting the DCI and having the lowest CORESET-ID among one or more CORESETs monitored by a UE in the latest slot within the active BWP of a serving cell in a search space monitored by the UE. If a scheduling offset between the last symbol of the PDCCH carrying the triggering DCI and the first symbol of the transmission of aperiodic SRS resource(s) is greater than or equal to the time duration threshold, the default spatial relation may be determined as a spatial relation for a reception of the CORESET used for the triggering DCI transmission. The method may further comprise receiving a configuration of a higher layer index for each SRS resource or each SRS resource set with the usage set to 'codebook', 'nonCodebook' and 'antennaSwitching'. When periodic SRS resource(s) are transmitted, the default spatial relation is determined as a spatial relation for a reception of a CORESET configured with the same index value as that configured for the SRS resource(s) or SRS resource set containing the SRS resource(s) and having the lowest CORESET-ID among one or more CORESETs monitored by a UE in the latest slot within the active BWP of a serving cell in a search space monitored by the UE. Alternatively, when a usage of the periodic SRS is 'antennaSwitching', the default spatial relation is determined as a spatial relation for a reception of the latest received PDSCH scheduled by a DCI transmitted from the CORESET configured with the same index value as that configured for the SRS resource(s) or SRS resource set containing the SRS resource(s), and when a usage of the periodic SRS is 'codebook' or 'non-codebook', the default spatial relation is determined as a spatial relation for a transmission of the latest PUSCH scheduled by a DCI transmitted from the CORESET configured with the same index value as that configured for the SRS resource or SRS resource set. In some embodiment, the method further comprises receiving a configuration of two or more SRS resource sets used for codebook and non-codebook based UL transmission, wherein an index value is configured for each SRS resource set, wherein, when SRS resource(s) are transmitted, the default spatial relation is determined as a spatial relation for a reception of CSI-RS or SS/PBCH indicated by the higher layer parameter pathlossReferenceRS configured for the SRS resource set containing the SRS resource(s).

In some embodiment, PUCCH resource(s) indicated by the 'PUCCH resource indicator' field in a DCI are transmitted, an index is configured for each CORESET, and the default spatial relation is determined as a spatial relation for a reception of a CORESET configured with the same index value as the CORESET transmitting the DCI and having the lowest CORESET-ID among one or more CORESETs monitored by a UE in the latest slot within the active BWP of a serving cell in a search space monitored by the UE. If a scheduling offset between the last symbol of the PDCCH carrying the triggering DCI and the first symbol of the transmission of PUCCH resource(s) is greater than or equal to the time duration threshold, the default spatial relation is determined as a spatial relation for a reception of the CORESET used for the PDCCH transmission. In some embodiment, the method may further comprise receiving a configuration for one or more PUCCH groups, wherein, each PUCCH group is associated with a higher layer index value configured for CORESET or is configured with a higher layer index. When PUCCH resource(s) are transmitted, the default spatial relation is determined as a spatial relation for a reception of a CORESET configured with the same index value as the PUCCH group containing the PUCCH resource(s) and having the lowest CORESET-ID among one or more CORESETs monitored by a UE in the latest slot within the active BWP of a serving cell in a search space monitored by the UE. Alternatively, the default spatial relation is determined as a spatial relation for a transmission of the latest PUSCH within the latest N slots scheduled by a DCI transmitted from the CORESET configured with the same index value as that is configured for or associated with the PUCCH resource(s). Alternatively, the default spatial relation is determined as a spatial relation for a transmission of the latest SRS transmitted to the same TRP. Alternatively, the default spatial relation is determined as a spatial relation for a reception of the latest received PDSCH within the latest N slots scheduled by a DCI transmitted from the CORESET configured with the same index value as that is configured for or associated with the PUCCH resource(s). The method may further comprise receiving a configuration of two or more PUCCH-PathlossReferenceRS groups, wherein each PUCCH-PathlossReferenceRS group contains one or more PUCCH-PathlossReferenceRS, wherein each PUCCH-PathlossReferenceRS group is associated with one PUCCH group. When PUCCH resource(s) are transmitted, the default spatial relation is determined as a spatial relation for a reception of CSI-RS or SS/PBCH indicated by a higher layer parameter PUCCH-PathlossReferenceRS with the lowest ID within the PUCCH-PathlossReferenceRS group associated with the PUCCH group containing the PUCCH resource(s).

In some embodiment, the default spatial relation is determined as a spatial domain filter for a reception of CSI-RS associated with 'QCL-Type-D' in the TCI state or a spatial domain filter for a reception of the SS/PBCH block determined by the QCL assumption, whichever is applied for the reception of the CORESET. In some other embodiment, the default spatial relation is determined as a spatial domain filter for a reception of CSI-RS associated with 'QCL-Type-D' in the TCI state or a spatial domain filter for a reception of the SS/PBCH block determined by the QCL assumption, whichever is applied for the reception of the latest received PDSCH.

In one embodiment, a method comprises determining a default spatial relation for reception of an uplink signal if no higher layer parameter for indicating a spatial relation is configured for the reception of the uplink signal; and receiving the uplink signal using the determined default spatial relation.

In another embodiment, a remote unit comprises a processor configured to determine a default spatial relation for transmission of an uplink signal if no higher layer parameter for indicating a spatial relation is configured for the transmission of the uplink signal; and a transmitter configured to transmit the uplink signal using the determined default spatial relation.

In yet another embodiment, a base unit comprises a processor configured to determine a default spatial relation for reception of an uplink signal if no higher layer parameter for indicating a spatial relation is configured for the reception of the uplink signal; and a receiver configured to receive the uplink signal using the determined default spatial relation.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, ad program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

In all of the below embodiments, the spatial relation information (e.g. spatial domain filter) is not configured to the UE (or although configured, no activation command is received at the UE) for transmission of an uplink signal, e.g., uplink sounding reference signal such as SRS or uplink control signal such as PUCCH.

The first embodiment is related to transmission of aperiodic SRS.

In a first situation, a UE is configured with one or more SRS resource sets with usage='nonCodebook', and an associated CSI-RS is configured by higher layer parameter associatedCSI-RS. In the first situation, the UE transmits the SRS resource(s) within a SRS resource set (that has usage of 'nonCodebook' or 'Codebook' or 'antennaSwitching' but not 'BeamManagement'), using a same spatial domain filter as that for reception of a CSI-RS with a resource index indicated by the higher layer parameter associatedCSI-RS configured for the SRS resource set. The serving cell to which the SRS resource(s) are transmitted is the same as that from which the CSI-RS is transmitted. That is, the spatial domain filter for reception of a CSI-RS with a resource index indicated by the higher layer parameter associatedCSI-RS configured for the SRS resource set is determined as the default spatial relation for transmitting the SRS resource(s) of the SRS resource set.

In a second situation, a UE is configured with one or more SRS resource sets with usage='nonCodebook', but the higher layer parameter associatedCSI-RS is not configured, or a UE is not configured with a SRS resource set with usage='nonCodebook'. In the second situation, depending on the comparison of a scheduling offset and a UE reported threshold, the default spatial relation for transmitting the SRS resource(s) of the SRS resource set may be determined differently.

Figure 1:
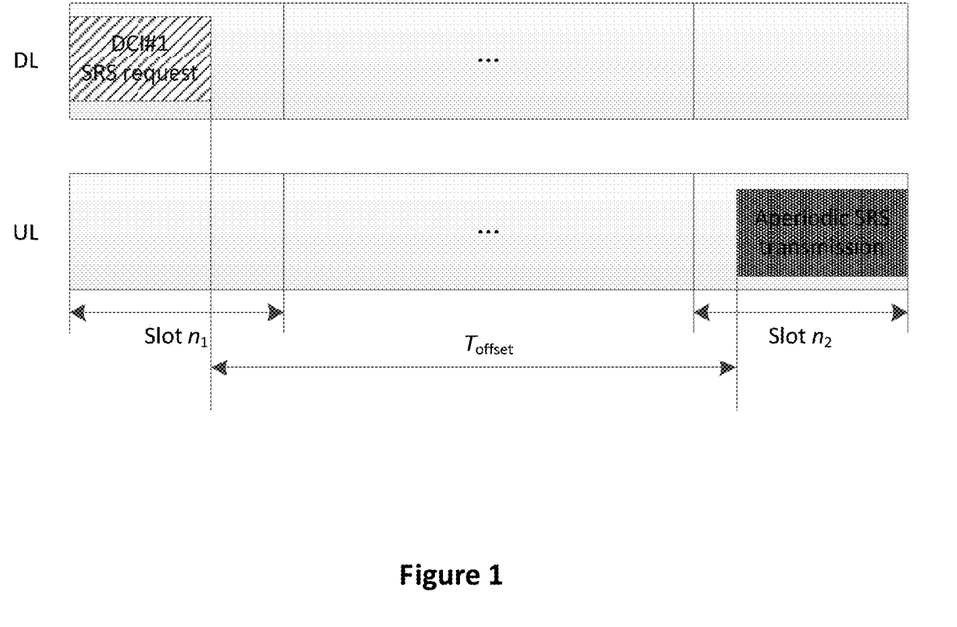
FIG. 1 illustrates the scheduling offset in the scenario of transmitting aperiodic SRS.

FIG. 1 illustrates the scheduling offset in the scenario of transmitting aperiodic SRS. The scheduling offset refers to a time period between the last symbol of the PDCCH carrying the DCI for triggering a SRS transmission and the first symbol of the transmission of the triggered SRS. As shown in FIG. 1, the UE receives, in slot $n_1$, a DCI (i.e. DCI #1) containing 'SRS request' field triggering an aperiodic SRS transmission in slot $n_2$. The scheduling offset $T_{offset}$ refers to the time period starting from the last symbol of PDCCH carrying the DCI #1 in the slot $n_1$ and ending at the first symbol of the aperiodic SRS transmission in the slot $n_2$.

The UE reports a capability that indicates a time duration threshold $T_0$ for determining the spatial relation. The time duration threshold $T_0$ is the UE reported threshold. If the UE does not report the capability, the time duration threshold $T_0$ is assumed to be 0 ms by default.

A CORESET includes a set of time-frequency resources that can be used for PDCCH transmission. A DCI is transmitted from a CORESET. In other words, CORESET may be used for DCI transmission triggering SRS (either aperiodic SRS or periodic SRS) transmission. If the scheduling offset $T_{offset}$ is equal to or greater than the UE reported threshold $T_0$, the UE transmits the SRS resource(s) using the same spatial domain filter as that for a reception of the CORESET used for the triggering DCI transmission. In particular, the spatial domain filter for a reception of CSI-RS associated with 'QCL-Type-D' in the TCI state or the spatial domain filter for a reception of the SS/PBCH block determined by the QCL assumption may be applied as the spatial domain filter for the reception of the CORESET used for the triggering DCI transmission.

If the scheduling offset $T_{offset}$ is smaller than the UE reported threshold $T_0$, the UE transmits the SRS resource(s) using the same spatial domain filter as that for a reception of a predetermined CORESET. The UE monitors one or more CORESETs within the active BWP of the serving cell in a monitored search space. Each CORESET is configured with a higher layer index for the TRP distinguish. That is, the CORESET(s) associated with the same TRP are configured with the same index value. In the latest slot, the CORESET configured with the same index value as the CORESET transmitting the DCI and having the lowest CORESET-ID is the predetermined CORESET. In particular, the spatial domain filter for a reception of CSI-RS associated with 'QCL-Type-D' in the TCI state or the spatial domain filter for a reception of the SS/PBCH block determined by the QCL assumption may be applied as the spatial domain filter for the reception of the predetermined CORESET.

Alternatively, the UE may, irrespective of the comparison between the scheduling offset $T_{offset}$ and the UE reported threshold $T_0$, transmit the SRS resource(s) using the same spatial domain filter as that for the reception of the predetermined CORESET.

The second embodiment is related to periodic SRS transmission.

As described above, a higher layer index can be configured for each CORESET for the TRP distinguish. In particular, the CORESET(s) associated with the same TRP should be configured with the same index value. Therefore, the same index value can be configured to the SRS resource or SRS resource set transmitted to the same TRP. That is, one index value indicates one TRP.

For periodic SRS transmission, the default spatial relation may be determined based on different usages of the SRS resource set.

The SRS resource set with usage='antennaSwitching' is usually used for DL CSI acquisition for PDSCH scheduling. In view of the above, for periodic SRS with the usage='antennaSwitching', the UE may transmit the SRS resource(s) using the same spatial domain filter as that for a reception of the latest received PDSCH scheduled by a DCI transmitted from the CORESET configured with the same index value as that configured for the SRS resource or SRS resource set. The spatial domain filter for the reception of the CSI-RS associated with 'QCL-Type-D' in the TCI state or the spatial domain filter for the reception of the SS/PBCH block determined by the QCL assumption may be applied as the spatial domain filter for the reception of the above-identified latest received PDSCH.

The SRS resource set with usage='codebook' or 'non-Codebook' is usually used for UL channel sounding for PUSCH scheduling. In view of the above, for periodic SRS with usage='codebook' or 'non-codebook', the UE may transmit the SRS resource(s) using the same spatial domain filter as that for a transmission of the latest PUSCH scheduled by a DCI transmitted from the CORESET configured with the same index value as that configured for the SRS resource or SRS resource set.

Figure 2:
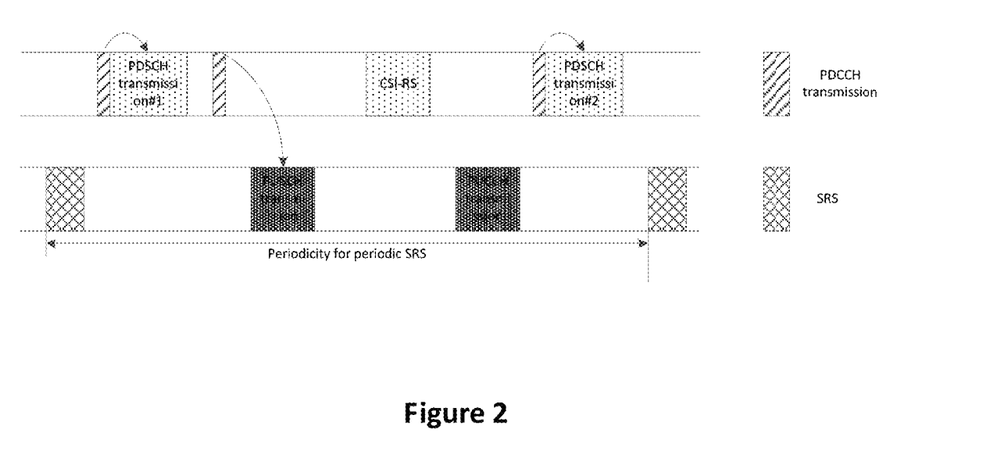
FIG. 2 illustrates default spatial relation determination based on different usages of the SRS resource set in a single-TRP example.

FIG. 2 illustrates default spatial relation determination based on different usages of the SRS resource set in a single-TRP example.

As shown in FIG. 2, if the higher layer parameter usage set to 'codebook' or 'nonCodebook' for the SRS, the UE transmits the second periodic SRS (the SRS shown outside the "periodicity for periodic SRS" in FIG. 2) using the same spatial domain filter as that for the transmission of the PUSCH in FIG. 2. If higher layer parameter usage set to 'antennaSwitching' for the SRS, the UE transmits the second periodic SRS using the same spatial domain filter as that for a reception of PDSCH transmission #2. The spatial domain filter for reception of CSI-RS associated with 'QCL-Type-D' in the determined TCI state or the spatial domain filter for reception of the SS/PBCH block determined by the QCL assumption may be applied as the spatial domain filter for the reception of PDSCH transmission #2.

For periodic SRS transmission, the UE may alternatively transmit the SRS resource(s) using the same spatial domain filter as that for a reception of a predetermined CORESET. The UE monitors one or more CORESETs within the active BWP of the serving cell in a monitored search space. Each CORESET is configured with a higher layer index for the TRP distinguish. That is, the CORESET(s) associated with the same TRP are configured with the same index value. Each SRS resource set or SRS resource transmitted to the same TRP is also configured with the same index value. In the latest slot, the CORESET configured with the same index value as the SRS resource(s) or the SRS resource set containing the SRS resource(s) and having the lowest CORESET-ID is the predetermined CORESET. In particular, the spatial domain filter for a reception of CSI-RS associated with 'QCL-Type-D' in the TCI state or the spatial domain filter for a reception of the SS/PBCH block determined by the QCL assumption may be applied as the spatial domain filter for the reception of the predetermined CORESET.

For periodic SRS transmission, the default spatial relation may be alternatively determined by referring to the pathloss reference RS for SRS resource configured by a higher layer parameter pathlossReferenceRS. As described above, each SRS resource set may be configured with one higher layer index for TRP distinguish. The SRS resource sets used for the same TRP may be configured with the same index value. Different SRS resource sets with different index values (i.e. corresponding to different TRPs) have different parameter pathlossReferenceRS corresponding to CSI-RS or SS/PBCH transmitted from the respective TRP. The UE may transmit the SRS resource(s) using the same spatial domain filter as that for a reception of CSI-RS or SS/PBCH indicated by the higher layer parameter pathlossReferenceRS configured for the SRS resource set containing the SRS resource(s).

For example, in the scenario with two TRPs, a UE can be configured with two SRS resource sets used for codebook or non-codebook based UL transmission. All SRS resources within one SRS resource set are transmitted to one TRP. The UE can transmit the SRS resource(s) using the same spatial domain filter as that for a reception of CSI-RS indicated by the higher layer parameter pathlossReferenceRS configured for or used by the SRS resource set containing the SRS resource(s).

The third embodiment is related to PUCCH transmission triggered by DCI. The PUCCH resources are indicated by 'PUCCH resource indicator' field in a DCI.

In a first situation, two or more PUCCH-SpatialRelation-Info are configured for the UE in FR2 in RRC connected mode. However, an activation command for PUCCH-SpatialrelationInfo for PUCCH resource(s) is not received at the UE (i.e. it is unknown which PUCCH-SpatialRelationInfo should be activated for each PUCCH resource). In this situation, the UE may transmit the PUCCH resource(s) using the spatial domain filter indicated by the PUCCH-SpatialRelationInfo with the lowest ID, i.e. PUCCH-SpatialrelationInfoId=0.

In a second situation, PUCCH-SpatialRelationInfo is not configured for the UE in FR2 in RRC connected mode, or the UE does not receive an activation command for PUCCH-SpatialRelationInfo. In the second situation, depending on the comparison of a scheduling offset and a UE reported threshold, the default spatial relation for transmitting the PUCCH resource(s) may be determined differently.

The scheduling offset refers to a time period between the last symbol of the PDCCH carrying the DCI for triggering a PUCCH transmission and the first symbol of the transmission of the triggered PUCCH resource(s).

Figure 3:
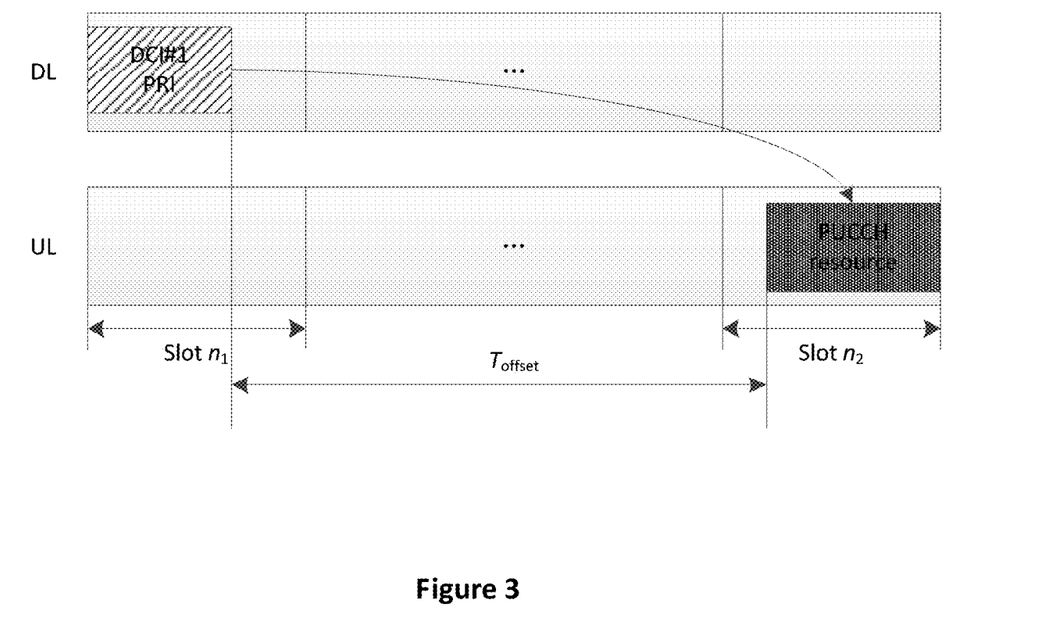
FIG. 3 illustrates the scheduling offset in the scenario of transmitting PUCCH.

FIG. 3 illustrates the scheduling offset in the scenario of transmitting PUCCH. The UE receives, in slot $n_1$, a DCI (i.e. DCI #1) containing 'PUCCH resource indicator' field triggering a PUCCH resource transmitted in slot $n_2$. The scheduling offset $T_{offset}$ refers to the time period starting from the last symbol of PDCCH carrying DCI #1 in the slot $n_1$ and ending at the first symbol of the PUCCH resource transmission in the slot $n_2$.

The UE reports a capability that indicates a time duration threshold $T_0$ for determining the spatial relation. The time duration threshold $T_0$ is the UE reported threshold. If the UE does not report the capability, the time duration threshold $T_0$ is assumed to be 0 ms by default.

As described above, a CORESET includes a set of time-frequency resources that can be used for PDCCH transmission. A CORESET may be used for DCI transmission triggering PUCCH transmission. If the scheduling offset $T_{offset}$ is equal to or greater than the UE reported threshold $T_0$, the UE transmits the PUCCH resource(s) using the same spatial domain filter as that for a reception of the CORESET used for the PDCCH transmitted in slot $n_1$. The spatial domain filter for the reception of the CSI-RS associated with 'QCL-Type-D' in the TCI state or the spatial domain filter for the reception of SS/PBCH block determined by the QCL assumption may be applied as the spatial domain filter for the reception of the CORESET used for the PDCCH transmitted in slot $n_1$.

If the scheduling offset $T_{offset}$ is smaller than the UE reported threshold $T_0$, the UE transmits the PUCCH resource(s) using the same spatial domain filter as that for a reception of a predetermined CORESET. The UE monitors one or more CORESETs within the active BWP of the serving cell in a monitored search space. Each CORESET is configured with a higher layer index for the TRP distinguish. That is, the CORESET(s) associated with the same TRP are configured with the same index value. In the latest slot, the CORESET configured with the same index value as the CORESET transmitting the DCI and having the lowest CORESET-ID is the predetermined CORESET. In particular, the spatial domain filter for a reception of CSI-RS associated with 'QCL-Type-D' in the TCI state or the spatial domain filter for a reception of the SS/PBCH block determined by the QCL assumption may be applied as the spatial domain filter for the reception of the predetermined CORESET.

Alternatively, the UE may, irrespective of the comparison between the scheduling offset $T_{offset}$ and the UE reported threshold $T_0$, transmit the PUCCH resource(s) using the same spatial domain filter as that for the reception of the predetermined CORESET.

The fourth embodiment is related to PUCCH transmission not triggered by DCI, e.g. PUCCH for periodic CSI feedback and SR transmission.

A higher layer index can be configured for each CORESET for the TRP distinguish. The CORESET(s) associated with the same TRP should be configured with the same index value.

Two or more PUCCH groups each of which comprises one or more PUCCH resources can be defined. Each PUCCH group may be associated with an index value configured for the CORESET. Alternatively, an index that configured for the CORESET may be directly configured for each of the two or more PUCCH groups. The same index value can be configured for the PUCCH resource(s) or PUCCH groups containing the PUCCH resource(s) transmitted to the same TRP. A valid window with N slots or M milliseconds is defined. N and M are positive integers. The default spatial relation is selected based on the following priority.

First priority: If there is one or more valid PUSCH in the latest N slots transmitted to the same TRP, the UE may use the same spatial domain filter as that for a transmission of the latest PUSCH scheduled by a DCI transmitted from the CORESET configured with the same index value as that is configured for or associated with the PUCCH resource within the latest N slots.

Second priority: In the condition that there is no PUSCH transmission in the latest N slots transmitted to the same TRP, if there is a valid SRS transmission in the latest N slots transmitted to the same TRP, the UE may transmit the PUCCH using the same spatial domain filter as that for a transmission of the latest SRS transmitted to the same TRP.

Third priority: In the condition that there is neither PUSCH transmission nor valid SRS transmission transmitted to the same TRP in the latest N slots, the UE may transmit the PUCCH using the same spatial domain filter as that for a reception of the latest received PDSCH transmission scheduled by a DCI transmitted from the CORESET configured with the same index value as that is configured for or associated with the PUCCH resource within the latest N slots. The spatial domain filter for a reception of CSI-RS associated with 'QCL-Type-D' in the TCI state or the SS/PBCH block determined by the QCL assumption may be applied as spatial domain filter for the reception of the above-identified latest received PDSCH transmission.

Figure 4:
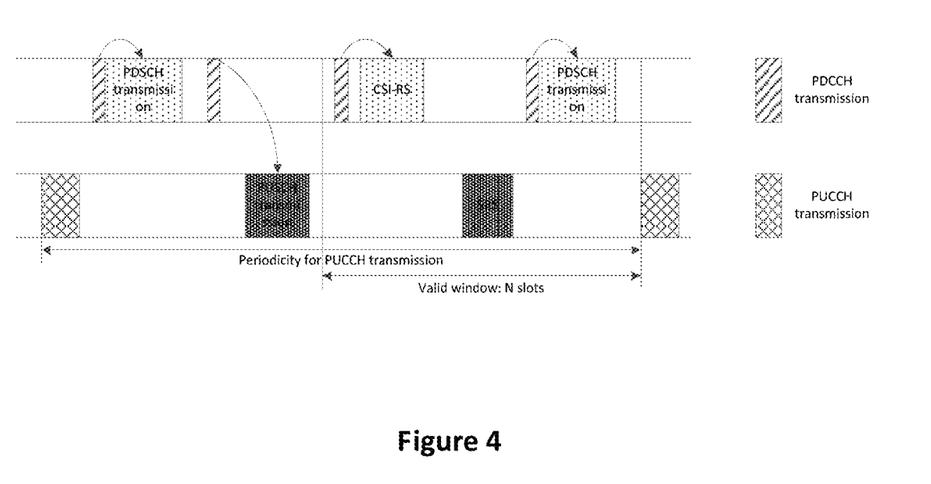
FIG. 4 illustrates an example of determining the default spatial domain filter for the PUCCH transmission not triggered by DCI.

FIG. 4 illustrates an example of determining the default spatial domain filter for the PUCCH transmission not triggered by DCI. As can be seen from FIG. 4, PUSCH transmission (first priority) is not in the valid window, while SRS (second priority) and PDSCH transmission (as well as CSI-RS) (third priority) are in the valid window. Therefore, according to the above-identified priority, the spatial domain filter for transmission of the SRS (second priority) is determined as the default spatial domain filter for the transmission of the second PUCCH transmission (i.e. the PUCCH transmission after the valid window).

For PUCCH transmission not triggered by DCI, the UE may alternatively transmit the PUCCH resource(s) in a PUCCH group using the same spatial domain filter as that for a reception of a predetermined CORESET. The UE monitors one or more CORESETs within the active BWP of the serving cell in a monitored search space. Each CORESET is configured with a higher layer index for the TRP distinguish. That is, the CORESET(s) associated with the same TRP are configured with the same index value. Each PUCCH group transmitted to the same TRP is configured with the same index value. In the latest slot, the CORESET configured with the same index value as the PUCCH group containing the PUCCH resource(s) and having the lowest CORESET-ID is the predetermined CORESET. In particular, the spatial domain filter for a reception of CSI-RS associated with 'QCL-Type-D' in the TCI state or the spatial domain filter for a reception of the SS/PBCH block determined by the QCL assumption may be applied as the spatial domain filter for the reception of the predetermined CORESET.

For PUCCH transmission not triggered by DCI, the default spatial relation may be alternatively determined by referring to the pathloss reference RS configured by a higher layer parameter PUCCH-PathlossReferenceRS for PUCCH. Two or more PUCCH-PathlossReferenceRS groups may be configured. Each PUCCH-PathlossReferenceRS group contains one or more PUCCH-PathlossReferenceRS targeting one TRP.

A higher layer index can be configured for each PUCCH-PathlossReferenceRS group. If a higher layer index is configured for both a PUCCH group and a PUCCH-PathlossReferenceRS group, the PUCCH group and the PUCCH-PathlossReferenceRS group are associated when the configured indices have the same value Alternatively, each PUCCH-PathlossReferenceRS group may be associated with one index value configured for the CORESET. As each PUCCH group is also configured with a higher layer index for TRP distinguish, the PUCCH group and the PUCCH-PathlossReferenceRS group are associated when they are associated with the same index value for the CORESET.

The UE may transmit PUCCH resource(s) using the same spatial domain filter as that for a reception of CSI-RS or SS/PBCH indicated by the higher layer parameter PUCCH-PathlossReferenceRS with the lowest PUCCH-PathlossReferenceRS-Id within the PUCCH-PathlossReferenceRS group associated with the PUCCH group containing the PUCCH resource(s).

Figure 5:
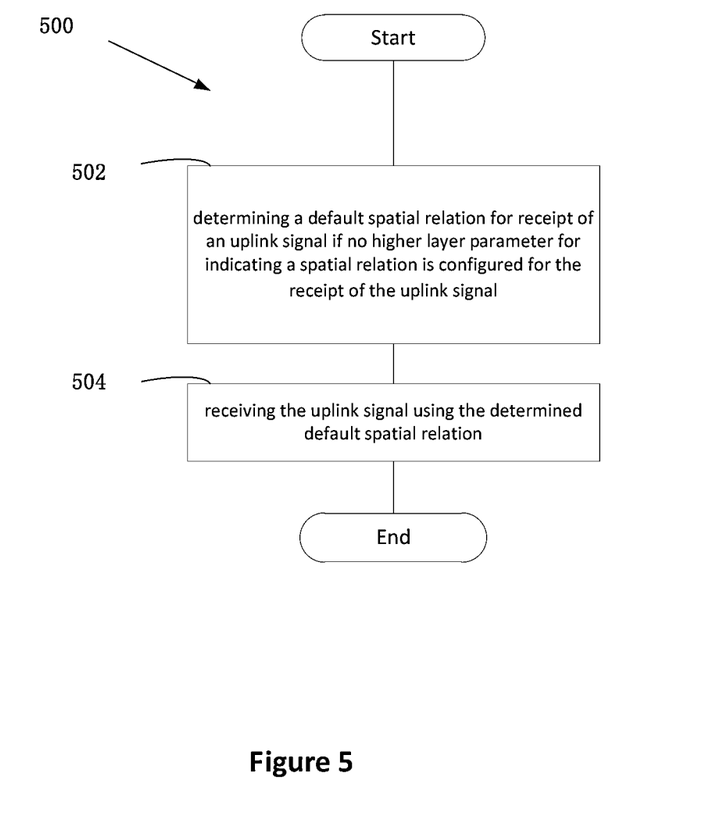
FIG. 5 is a schematic flow chart diagram illustrating an embodiment of a method.

FIG. 5 is a schematic flow chart diagram illustrating an embodiment of a method 500 according to the present application. In some embodiments, the method 500 is performed by an apparatus, such as a base unit. In certain embodiments, the method 500 may be performed by a processor executing program code, for example, a microcontroller, a microprocessor, a CPU, a GPU, an auxiliary processing unit, a FPGA, or the like.

The method 500 may include 502 determining a default spatial relation for reception of an uplink signal if no higher layer parameter for indicating a spatial relation is configured for the reception of the uplink signal. The method 500 may further include 504 receiving the uplink signal using the determined default spatial relation.

Figure 6:
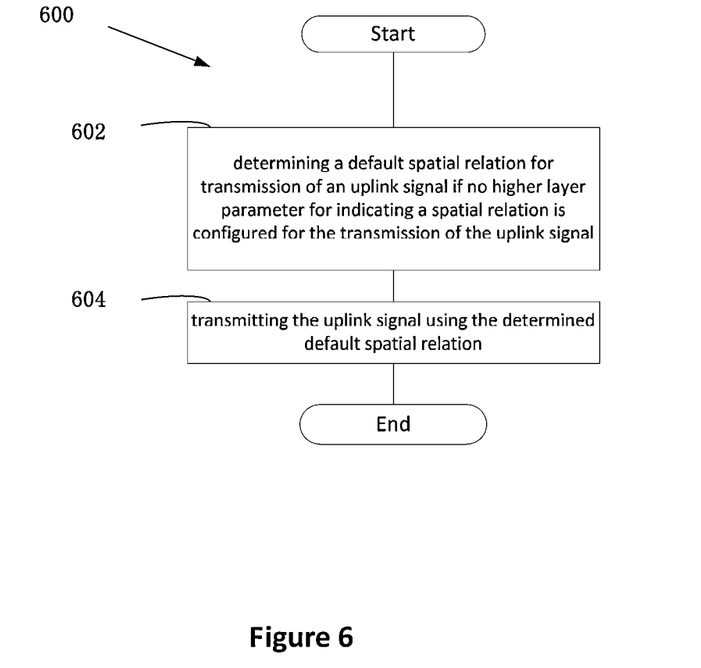
FIG. 6 is a schematic flow chart diagram illustrating a further embodiment of a method.

FIG. 6 is a schematic flow chart diagram illustrating a further embodiment of a method 600 according to the present application. In some embodiments, the method 600 is performed by an apparatus, such as a remote unit. In certain embodiments, the method 600 may be performed by a processor executing program code, for example, a microcontroller, a microprocessor, a CPU, a GPU, an auxiliary processing unit, a FPGA, or the like.

The method 600 may include 602 determining a default spatial relation for transmission of an uplink signal if no higher layer parameter for indicating a spatial relation is configured for the transmission of the uplink signal. The method 600 may further include 604 transmitting the uplink signal using the determined default spatial relation.

Figure 7:
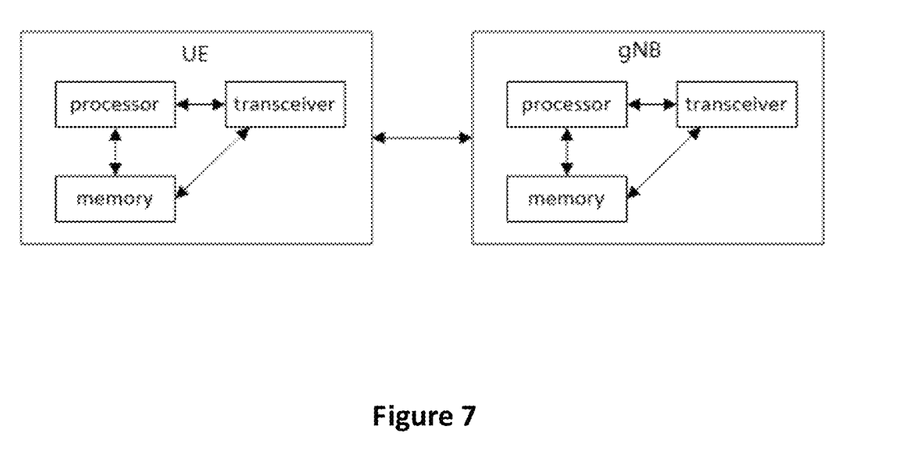
FIG. 7 is a schematic block diagram illustrating apparatuses according to one embodiment.

FIG. 7 is a schematic block diagram illustrating apparatuses according to one embodiment.

Referring to FIG. 7, the UE (i.e. the remote unit) includes a processor, a memory, and a transceiver. The processor implements a function, a process, and/or a method which are proposed in FIG. 6. The eNB (i.e. base unit) includes a processor, a memory, and a transceiver. The processors implement a function, a process, and/or a method which are proposed in FIG. 5. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving, from a transmission reception point (TRP) of a plurality of TRPs and using a control resource set (CORESET) associated with an index value, a downlink control channel carrying a downlink control information (DCI) that triggers an SRS transmission corresponding to one or more SRS resource sets, wherein the index value is associated with a spatial relation for the SRS transmission;
selecting, for the SRS transmission, the spatial relation associated with the index value based on the spatial relation not being configured by a higher layer parameter; and
transmitting, to the TRP and based on the one or more SRS resource sets being associated with the index value, the SRS transmission using the one or more SRS resource sets and the spatial relation associated with the index value.

2. The method of claim 1, wherein the SRS transmission is transmitted in a physical uplink control channel (PUCCH).

3. The method of claim 1, further comprising:
reporting a capability of the UE to indicate a time duration threshold for selecting the spatial relation.

4. The method of claim 1, wherein:
the one or more SRS resource sets comprise one or more aperiodic SRS resources triggered by the DCI;
respective index values are configured for a plurality of CORESETs comprising the CORESET and one or more CORESETs monitored by the UE; and
the spatial relation is for reception using an additional CORESET configured with a same index value as the CORESET and having a lowest CORESET index value among the one or more CORESETs in a latest slot within an active bandwidth part (BWP) of a serving cell in a search space monitored by the UE.

5. The method of claim 2, further comprising:
receiving a configuration for one or more physical uplink control channel (PUCCH) groups, wherein each PUCCH group of the one or more PUCCH groups is associated with a higher layer index value configured for a respective CORESET or is configured with a higher layer index.

6. A user equipment (UE) for wireless communication, comprising:
at least one memory; and
at least one processor coupled with the at least one memory and configured to cause the UE to:
receive, from a transmission reception point (TRP) of a plurality of TRPs and using a control resource set (CORESET) associated with an index value, a downlink control channel carrying a downlink control information (DCI) that triggers an SRS transmission corresponding to one or more SRS resource sets, wherein the index value is associated with a spatial relation for the SRS transmission;
selecting, for the SRS transmission, the spatial relation associated with the index value based on the spatial relation not being configured by a higher layer parameter; and
transmit, to the TRP and based on the one or more SRS resource sets being associated with the index value, the SRS transmission using the one or more SRS resource sets and the spatial relation associated with the index value.

7. The UE of claim 6, wherein the SRS transmission is transmitted in a physical uplink control channel (PUCCH).

8. The UE of claim 6, wherein the at least one processor is further configured to cause the UE to report a capability of the UE to indicate a time duration threshold for selecting the spatial relation.

9. The UE of claim 6, wherein:
the one or more SRS resource sets comprise one or more aperiodic SRS resources triggered by the DCI;
respective index values are configured for a plurality of CORESETs comprising the CORESET and one or more CORESETs monitored by the UE; and
the spatial relation is for reception using an additional CORESET configured with a same index value as the CORESET and having a lowest CORESET index value among the one or more CORESETs in a latest slot within an active bandwidth part (BWP) of a serving cell in a search space monitored by the UE.

10. The UE of claim 8, wherein:
the one or more SRS resource sets comprise one or more aperiodic SRS resources triggered by the DCI; and
the spatial relation associated with the index value is selected based on a scheduling offset between a last symbol of a physical downlink control channel (PDCCH) carrying the DCI and a first symbol of the SRS transmission being greater than or equal to the time duration threshold.

11. The UE of claim 6, wherein the at least one processor is further configured to case the UE to:
receive a configuration of two or more SRS resource sets used for codebook and non-codebook based uplink transmission, wherein:
respective index values are configured for the two or more SRS resource sets; and
the spatial relation is for a reception of at least one of a channel state information-reference signal (CSI-RS), a synchronization signal (SS), or a physical broadcast channel (PBCH) indicated by an additional higher layer parameter, pathlossReferenceRS, configured for an SRS resource set of the two or more SRS resource sets, the one or more SRS resource sets comprising the SRS resource set.

12. The UE of claim 7, wherein the at least one processor is further configured to cause the UE to:
receive a configuration for one or more physical uplink control channel (PUCCH) groups, wherein each PUCCH group of the one or more PUCCH groups is associated with a higher layer index value configured for a respective CORESET or is configured with a higher layer index.

13. A network equipment (NE) for wireless communication, comprising:
at least one memory; and
at least one processor coupled with the at least one memory and configured to cause the NE to:
transmit, using a control resource set (CORESET) associated with an index value, a downlink control channel carrying a downlink control information (DCI) that triggers an SRS transmission corresponding to one or more SRS resource sets, wherein the index value is associated with a spatial relation, wherein the index value corresponds to a TRP of a plurality of TRPs; and
receive, based on the one or more SRS resource sets being associated with the index value, the SRS transmission using the one or more SRS resource sets and the spatial relation associated with the index value based on the spatial relation not being configured by a higher layer parameter.

14. The NE of claim 13, wherein the SRS transmission is received in a physical uplink control channel (PUCCH).

15. The NE of claim 13, wherein the at least one processor is further configured to cause the NE to receive a report that indicates a capability of a user equipment (UE) to indicate a time duration threshold for selecting the spatial relation.

16. The NE of claim 13, wherein:
the one or more SRS resource sets comprise one or more aperiodic SRS resources triggered by the DCI;
respective index values are configured for a plurality of CORESETs comprising the CORESET and one or more CORESETs used for transmission to a user equipment (UE); and
the spatial relation is for transmission using an additional CORESET configured with a same index value as the CORESET and having a lowest CORESET index value among the one or more CORESETs in a latest slot within an active bandwidth part (BWP) of a serving cell in a search space used for transmission to the UE.

17. The NE of claim 15, wherein:
the one or more SRS resource sets comprise one or more aperiodic SRS resources triggered by the DCI; and
the spatial relation associated with the index value is based on a scheduling offset between a last symbol of a physical downlink control channel (PDCCH) carrying the DCI and a first symbol of the SRS transmission being greater than or equal to the time duration threshold.

18. The NE of claim 13, wherein the at least one processor is further configured to case the NE to:
transmit a configuration of two or more SRS resource sets used for codebook and non-codebook based uplink transmission, wherein:
respective index values are configured for the two or more SRS resource sets; and
the spatial relation is for a transmission of at least one of a channel state information-reference signal (CSI-RS), a synchronization signal (SS), or a physical broadcast channel (PBCH) indicated by an additional higher layer parameter, pathlossReferenceRS, configured for an SRS resource set of the two or more SRS resource sets, the one or more SRS resource sets comprising the SRS resource set.

19. The NE of claim 14, wherein the at least one processor is further configured to cause the NE to:
transmit a configuration for one or more physical uplink control channel (PUCCH) groups, wherein each PUCCH group of the one or more PUCCH groups is associated with a higher layer index value configured for a respective CORESET or is configured with a higher layer index.

20. A processor for wireless communication, comprising:
at least one controller coupled with at least one memory and configured to cause the processor to:
receive, from a transmission reception point (TRP) of a plurality of TRPs and using a control resource set (CORESET) associated with an index value, a downlink control channel carrying a downlink control information (DCI) that triggers an SRS transmission corresponding to one or more SRS resource sets, wherein the index value is associated with a spatial relation for the SRS transmission;
select, for the SRS transmission, the spatial relation associated with the index value based on the spatial relation not being configured by a higher layer parameter; and
transmit, to the TRP and based on the one or more SRS resource sets being associated with the index value, the SRS transmission using the one or more SRS resource sets and the spatial relation associated with the index value.

* * * * *